United States Patent [19]

Takeuchi et al.

[11] Patent Number: 5,382,459
[45] Date of Patent: Jan. 17, 1995

[54] GLASS FIBER REINFORCED RESIN COMPOSITION AND WHEEL CAP FORMED OF SAME

[75] Inventors: Junji Takeuchi, Inazawa; Junji Koizumi, Nagoya, both of Japan

[73] Assignee: Toyoda Gosei Co., Ltd., Nishikasugai, Japan

[21] Appl. No.: 112,304

[22] Filed: Aug. 27, 1993

Related U.S. Application Data

[63] Continuation of Ser. No. 620,469, Nov. 30, 1990, abandoned, which is a continuation-in-part of Ser. No. 598,885, Oct. 19, 1990, abandoned.

[30] Foreign Application Priority Data

Oct. 20, 1989 [JP] Japan .................... 1-274528

[51] Int. Cl.$^6$ ............... B29D 22/00; C08F 10/02; C08K 3/40; C08G 63/48
[52] U.S. Cl. ............... 428/36.4; 428/292; 523/202; 523/203; 524/504; 524/505; 525/71
[58] Field of Search ............... 523/202, 203; 524/504, 524/505; 525/71; 428/292, 36.4

[56] References Cited

U.S. PATENT DOCUMENTS

| | | |
|---|---|---|
| 4,603,153 | 7/1986 | Sobajima et al. . |
| 4,621,115 | 11/1986 | Morita et al. . |
| 4,663,369 | 5/1987 | Kawai et al. . |
| 4,707,505 | 11/1987 | Matsuno et al. . |
| 4,707,528 | 11/1987 | Koizumi et al. . |
| 4,731,401 | 3/1988 | Moteki et al. . |
| 4,863,995 | 9/1989 | Murakami et al. . |
| 5,079,281 | 1/1992 | Takeuchi et al. . |
| 5,082,889 | 1/1992 | Koizumi et al. . |

*Primary Examiner*—James D. Withers
*Attorney, Agent, or Firm*—Cushman, Darby & Cushman

[57] ABSTRACT

A glass fiber reinforced resin composition is prepared, the composition consisting essentially of:
(1) 45 to 83% by weight of a crystalline ethylene-propylene block copolymer exhibiting a melt flow rate of 20 to 100 grams/10 minutes, comprising (i) an ethylene component in an amount of 3 to 12% by weight, and (ii) components having low molecular weights falling within the range of 1,000 to 50,000 in weight average molecular weight and soluble in chloroform at room temperature, in an amount of 0.3 to 3.5% by weight;
(2) 2 to 20% by weight of a polypropylene resin modified with an unsaturated carboxylic acid derivative; and
(3) 15 to 35% by weight of glass fiber. A wheel cap molded from the glass fiber reinforced resin composition has an excellent appearance, impact strength, rigidity, mechanical strength and thermal resistance, and can be manufactured at a low cost.

9 Claims, 1 Drawing Sheet

GLASS FIBER REINFORCED RESIN COMPOSITION AND WHEEL CAP FORMED OF SAME

This is a continuation of application Ser. No. 07/620,469, filed on Nov. 30, 1990, which was abandoned upon the filing hereof, which is a continuation-in-part of application Ser. No. 07/598,885, filed Oct. 19, 1990.

BACKGROUND OF THE INVENTION

1. Field of the Invention

The present invention relates to a glass fiber reinforced resin composition and a wheel cap formed of same.

2. Description of the Prior Art

Prior to now, resins have been used in making wheel caps for motor vehicles, such as automobiles, in order to satisfy the requirement for light weight. Since wheel caps must have good impact resistance, thermal resistance, etc., plastic materials such as nylon, modified polyphenylene oxide (PPO) and the like have been used in the resins. However, since these plastic materials are disadvantageously expensive, there is a need for a material which has good impact resistance, thermal resistance, etc., but is less expensive.

To meet this need, there has been proposed a wheel cap formed from a composition comprising a less expensive polypropylene resin and glass fiber, as set forth in Japanese Unexamined Utility Model Publication (KOKAI) No. 62333/1989.

It is generally known that glass fiber reinforced polypropylene is superior to nonreinforced polypropylene in its mechanical strength, rigidity, thermal resistance, creep resistance and the like. However, since the addition of glass fibers sometimes results in a poor appearance, various measures must be taken when preparing the glass fiber reinforced polypropylene in order to ensure that a good appearance is obtained.

For instance, in Japanese Examined Patent Publication (KOKOKU) No. 7618/1989, the desired characteristics are obtained in the produced glass fiber reinforced polypropylene resin primarily by requiring that only certain glass fibers in certain amounts be included in the resin. The composition disclosed by this publication requires the use of glass fibers having an average diameter of 7 μm or less, added in a predetermined amount, to improve the appearance of the resulting product.

SUMMARY OF THE INVENTION

It is an object of the present invention to provide a glass fiber reinforced resin composition suitable for use in a wheel cap or hub cap in a motor vehicle, said wheel cap having an excellent appearance, superior mechanical strength, high thermal resistance and the like. The resin composition having the desired characteristics comprises:

(1) a crystalline ethylene-propylene block copolymer exhibiting a melt flow rate of 20 to 100 grams/10 minutes, comprising (i) an ethylene component, and (ii) components having low molecular weights falling within the range of 1,000 to 50,000 in weight average molecular weight;

(2) a polypropylene resin modified with an unsaturated carboxylic acid derivative; and (3) glass fiber.

DETAILED DESCRIPTION OF THE INVENTION

Figure 1:
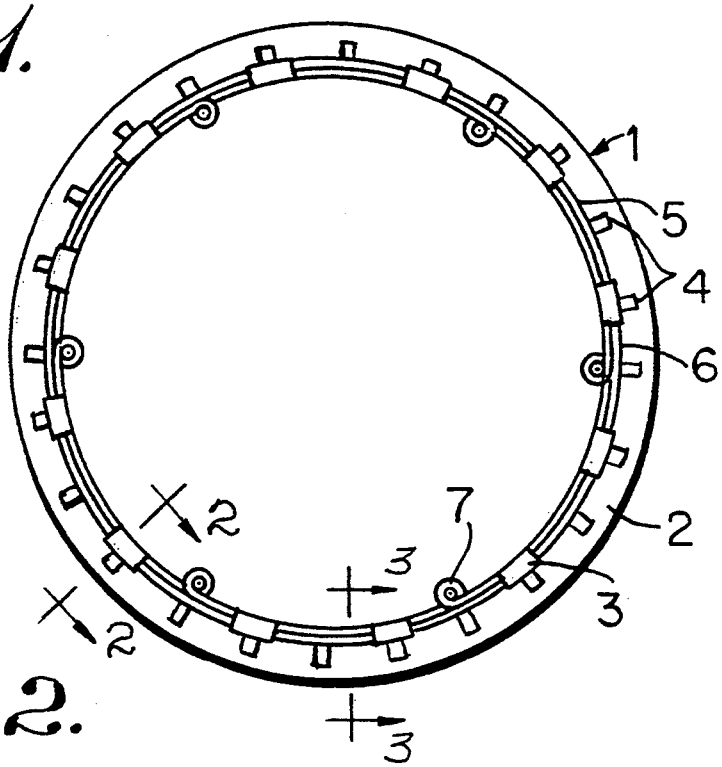
FIG. 1 is a plan view of the rear side surface of a wheel cap.

The glass fiber reinforced resin composition according to the present invention comprises:

(1) 45 to 83% by weight of a crystalline ethylene-propylene block copolymer exhibiting a melt flow rate of 20 to 100 grams/10 minutes, comprising (i) an ethylene component in an amount of 3 to 12% by weight, and (ii) components having low molecular weights falling within the range of 1,000 to 50,000 in weight average molecular weight, in an amount of 0.3 to 3.5% by weight;

(2) 2 to 20% by weight of a polypropylene resin modified with an unsaturated carboxylic acid derivative; and (3) 15 to 35% by weight of glass fiber.

Thus, the present glass fiber reinforced resin composition comprises a crystalline ethylene-propylene block copolymer, a modified polypropylene resin and a glass fiber.

The low molecular weight components are substances extracted from the crystalline ethylene-propylene block copolymer with chloroform at room temperature. Examples of the low molecular weight components include polypropylene, polyethylene, ethylene-propylene copolymer atactic polypropylene and the like. Although it is possible to add the low molecular weight components to the crystalline ethylene block copolymer separately, the low molecular weight components are generally produced as oligomer by-products during polymerization.

The presence of the low molecular weight components in the crystalline ethylene-propylene block copolymer improves to a remarkable extent the impact resistance of a product molded from the resin composition. In addition, since the crystalline ethylene-propylene resin exhibits a melt flow rate falling within the range of 20 to 100 grams/10 minutes, the molded product has an excellent appearance regardless of the fiber length of the glass fiber contained in the resin composition. Therefore, a wheel cap or hub cap molded from the glass fiber reinforced resin composition has an excellent appearance, impact strength, rigidity, mechanical strength and thermal resistance, and can be manufactured at a low cost.

The use of the crystalline ethylene-propylene block copolymer is central to the present invention. As noted above, the crystalline ethylene-propylene block copolymer contains 3 to 12% by weight of an ethylene component. When the ethylene component content is less than 3% by weight, the impact resistance of the glass fiber reinforced resin composition deteriorates. When the ethylene component content is greater than 12% by weight, the rigidity and the strength of the resin composition deteriorates.

The crystalline ethylene-propylene block copolymer also contains 0.3 to 3.5% by weight of components having low molecular weights falling in the range of 1,000 to 50,000 in weight average molecular weight. When the low molecular weight components make up less than 0.3% by weight of the copolymer, the impact resistance of the glass fiber reinforced resin composition declines sharply. When the low molecular weight components make up more than 3.5% by weight of the copolymer, the rigidity and strength of the resin composition declines. The amount of low molecular weight components contained in the crystalline ethylene-propylene block copolymer can be determined quantitatively by extraction of the components from the copolymer using chloroform at room temperature according to known methods.

The crystalline ethylene-propylene block copolymer used in the glass fiber reinforced resin composition exhibits a melt flow rate of 20 to 100 grams/10 minutes. When the melt flow rate is less than 20 grams/10 minutes, the appearance of the molded product deteriorates. When the melt flow rate is greater than 100 grams/10 minutes, the mechanical strength, particularly the impact resistance, of the resin composition deteriorates.

The term "modified polypropylene resin" as used herein refers to a polypropylene resin modified with an unsaturated carboxylic acid or acid anhydride. The unsaturated carboxylic acid can be maleic acid, fumaric acid and the like, and the acid anhydride can be maleic anhydride and the like. A conventional modified polypropylene resin can be employed.

The amount of modified polypropylene resin in the glass fiber reinforced resin composition falls in the range of 2 to 20% by weight. When the amount of modified polypropylene resin in the resin composition is less than 2% by weight, the rigidity, strength and impact resistance of the resin composition declines, and the appearance of the molded product deteriorates. When the amount of modified polypropylene resin is more than 20%, the cost of the resin composition increases, while the beneficial effects of the modified polypropylene resin addition reach their greatest extent and can increase no further.

The glass fiber reinforced resin composition contains 15 to 35% by weight of glass fiber. When the glass fiber content is less than 15% by weight, the physical properties of the resin composition such as rigidity, impact resistance, thermal resistance and the like deteriorate. When the glass fiber content is greater than 35% by weight, glass fibers appear on the surface of the molded product, thereby having an adverse effect on its appearance. The glass fiber is not required to be a particular length; it may be selected from conventional glass fibers of various lengths.

The crystalline ethylene-propylene block copolymer contains components having low molecular weights falling in the range of 1,000 to 50,000 in weight average molecular weight, in an amount of 0.3 to 3.5% by weight. The presence of the low molecular weight components in the glass fiber reinforced resin composition improves to a remarkable extent the impact resistance of the molded product. In addition, when the crystalline ethylene-propylene block copolymer has a melt flow rate of 20 to 100 grams/10 minutes, the molded product has an exceptionally excellent appearance regardless of the fiber length of the added glass fiber.

In summary, when the glass fiber reinforced resin composition of the present invention is employed, it is possible to manufacture a wheel cap having an excellent appearance, impact strength, rigidity, mechanical strength, thermal resistance and the like. As a result, without employing expensive plastic materials such as nylon, polyphenylene oxide (PPO) and the like, the wheel cap of the present invention has properties equivalent to or better than those of the more expensive conventional wheel caps made from these plastic materials.

PREFERRED EMBODIMENTS OF THE INVENTION

The present invention having been generally described, further understanding can be developed by reference to certain preferred embodiments which are provided herein for the purposes of illustration only.

First Preferred Embodiment

The following raw materials were mixed together to prepare a glass fiber reinforced resin composition:

(1) 65% by weight of crystalline ethylene-propylene block copolymer comprising 7% by weight of an ethylene component and 0.9% by weight of low molecular weight components (determined quantitatively using chloroform as the solvent with a Soxhlet extractor at room temperature for 8 hours), with the crystalline ethylene-propylene block copolymer exhibiting a melt flow rate of 30 grams/10 minutes;

(2) 30% by weight of glass fiber having a fiber length of 3 mm; and (3) 5% by weight of polypropylene resin modified with maleic acid.

The glass fiber reinforced resin composition was molded into test samples by injection molding at a cylinder temperature of 200° C. The test samples were measured and examined for their flexural strength, flexural modulus and Izod impact values in accordance with the standards of the American Society for Testing and Materials (ASTM).

A plate having a length of 40 mm, a width of 110 mm and a thickness of 2 mm was molded in the above-described manner, and the appearance of the molded product was inspected visually for protruding glass fibers.

A test sample having a length of 12.7 mm, a width of 100 mm and a thickness of 6.4 mm was molded in the above-described manner, and the state of the sink marks located at the central portion of the test sample was inspected visually.

Second through Fifth Preferred Embodiments and Comparative Examples 1 through 8

The glass fiber reinforced resin compositions of the Second through Fifth Preferred Embodiments and Comparative Examples 1 through 8 were prepared by varying the amounts of the components and the melt flow rates of the crystalline ethylene-propylene block copolymer. The test samples and the plates were then molded, and performance evaluation tests were carried out in the same manner as described above with reference to the First Preferred Embodiment.

The products molded from the glass fiber reinforced resin compositions of the First through Fifth Preferred Embodiments had excellent mechanical strength and excellent appearance. By contrast, the products molded from the glass fiber reinforced resin composition of Comparative Example 1 were inferior in their appearance and in the state of their sink marks, because the glass fiber reinforced resin composition employed a crystalline ethylene-propylene block copolymer having a low melt flow rate of 15 grams/10 minutes.

Similarly, the products molded from the glass fiber reinforced resin composition of Comparative Example 2 were also inferior in their appearance and in the state of their sink marks. In addition, these molded products exhibited little flexural strength, because the crystalline ethylene-propylene block copolymer of the resin composition had a low melt flow rate of 12 grams/10 minutes (a value smaller than that of the crystalline ethylene-propylene block copolymer of Comparative Example 1).

The products molded from the glass fiber reinforced resin composition of Comparative Example 3 did not contain the ethylene component and the low molecular weight components required according to the present invention, and these products exhibited sharply decreased Izod impact values. Although the ethylene component and the low molecular weight components were present in the molded products formed from the glass fiber reinforced resin composition of Comparative Example 4, these components were included in insufficient amounts, and thus the molded products exhibited unacceptably low Izod impact values.

In the products molded from the glass fiber reinforced resin composition of Comparative Example 5, the ethylene component was added in an amount falling within the appropriate range; however, the low molecular weight components were added in an amount of 0.1% by weight, an extremely small value compared with the amounts of low molecular weight components added to the resin compositions of the Preferred Embodiments. The products molded from the resin composition of Comparative Example 5 therefore exhibited extremely small Izod impact values and were found to have inferior impact resistance.

In the products molded from the glass fiber reinforced resin composition of Comparative Example 6, only 10% by weight of the glass fiber was included in the composition and thus, the molded products were inferior in flexural strength and flexural modulus. On the other hand, the products molded from the glass fiber reinforced resin composition of Comparative Example 7 included a very large amount of glass fiber (40% by weight); therefore, the products molded from the resin composition were inferior in their appearances.

Finally, the products molded from the glass fiber reinforced resin composition of Comparative Example 8 included only 1% by weight of the modified polypropylene resin in the composition; therefore, the molded products were inferior in their mechanical properties and in their appearances.

Evaluation of the Product

Wheel caps, formed from the glass fiber reinforced resin compositions of the First Preferred Embodiment and Comparative Examples 1 and 5, were molded by injection molding. The wheel caps were examined and evaluated with regard to their various properties.

Figure 2:
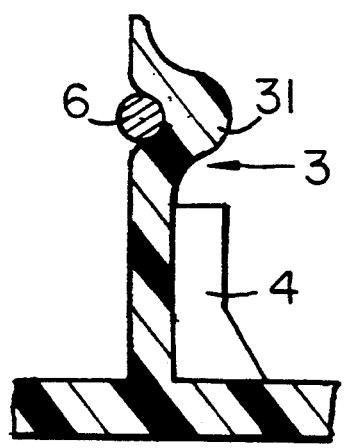
FIG. 2 is a cross-sectional view taken along line 2—2 of FIG. 1.
Figure 3:
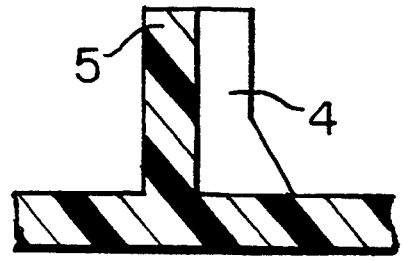
FIG. 3 is a cross-sectional view taken along line 3—3 of FIG. 1.
Figure 4:
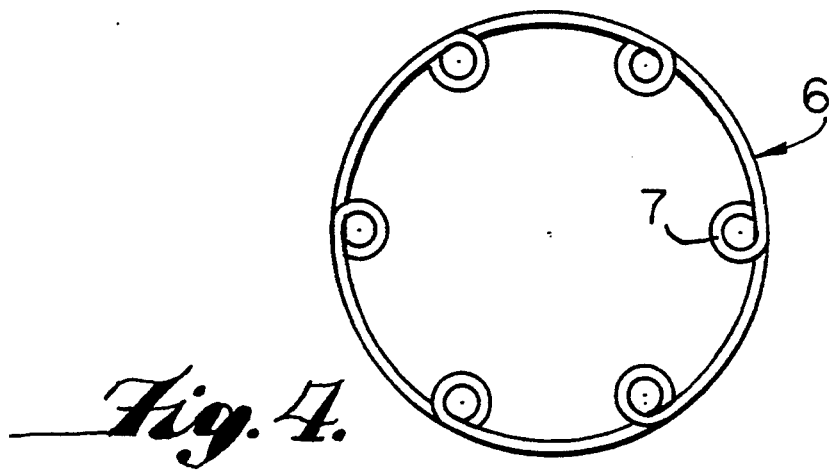
FIG. 4 is a plan view of a ring holder of the wheel cap.

A plan view of a wheel cap is illustrated in FIG. 1. A cross-sectional view of the wheel cap is illustrated in FIG. 2, taken along line 2—2 of FIG. 1. Another cross-sectional view of the wheel cap is illustrated in FIG. 3, taken along line 3—3 of FIG. 1. A plan view of the ring holder is illustrated in FIG. 4.

The wheel cap 1 comprises a base portion 2 having a disk shape; 12 engagement portions 3 disposed along the periphery of the base portion 2 on the rear surface thereof, spaced at intervals and protruding in the axial direction of the wheel cap; a circular rib 5 connecting the engagement portions 3; and 24 stopper ribs 4 protruding from the circular rib 5 outwardly and radially.

The base portion 2 has a disk shape with a diameter of 350 to 400 mm, and the general thickness thereof is 1.5 to 3 mm. The engagement portions 3 have a convex portion 31 for engagement with the inner periphery surface of a wheel disk, and the engagement portions are elastically deformable in the radial direction of the base portion 2. The stopper ribs 4 have an engagement surface, and the thickness thereof is 1 to 2 mm. The engagement surface faces the inner periphery surface of the wheel disk, and there is a clearance of approximately 3 mm or less between the engagement surface and the inner periphery surface of the wheel disk. The base portion 2, the engagement portions 3, the circular rib 5 and the stopper ribs 4 are formed as a single unit.

The wheel cap 1 is engaged with the ring holder 6 which is installed on the inner periphery surface of the wheel cap 1 and engaged with the engagement portions 3 thereof. The ring holder 6 applies pressure to the engagement portions 3 outwardly in the radial direction of the wheel cap 1. The engagement portions 3 of the wheel cap 1 are pressed and held onto the wheel disk by the pressure of the ring holder 6. The ring holder 6 has a plurality of loop portions 7, and is engaged with the engagement portions 3 by the elastic deformation of the loop portions 7.

The appearances of the wheel caps molded from the glass fiber reinforced resin compositions of the First Preferred Embodiment and Comparative Examples 1 and 5 were visually evaluated. Thereafter, the wheel caps were subjected to a repeated engagement and disengagement test, a thermal resistance test and a falling ball impact test. The results of the tests are summarized in Table 2 below.

TABLE 2

|  | 1st Pref. Embodiment | Comp. Ex. 1 | Comp. Ex. 5 |
| --- | --- | --- | --- |
| Repeated Engagement/Disengagement Test | Good | Good | Bad |
| Thermal Resistance Test | Good | Good | Good |
| Falling Ball Impact Test | Good | Good | Bad |
| Product Appearance | Good | Bad | Good |

The repeated engagement and disengagement test was performed in order to examine the occurrence of damage, such as cracks, etc., after repeatedly engaging and disengaging the wheel caps 1 with the ring holder 6 installed to and from the wheel disk. The results of the repeated engagement and disengagement test are as follows. No damage occurred in the wheel caps 1 molded from the glass fiber reinforced resin compositions of the First Preferred Embodiment and Comparative Example 1, even after engagement and disengagement were repeated 30 times or more. By contrast, cracks occurred after engagement and disengagement were repeated only 5 times in the wheel cap 1 molded from the glass fiber reinforced resin composition of Comparative Example 5 which contained the low molecular weight components in an amount less than that required according to the present invention (as determined by extraction with chloroform).

The thermal resistance test was carried out to examine the dimensional changes of the wheel caps 1 by placing the wheel caps 1 in a constant temperature oven heated at 120° C. for 24 hours. After 24 hours, the wheel caps 1 were taken out of the constant temperature oven, and their changes in dimension were measured. According to the thermal resistance test, substantially no harmful damage occurred in the wheel caps 1 molded from the glass fiber reinforced resin compositions of the First Preferred Embodiment and Comparative Examples 1 and 5.

The falling ball impact test was performed in order to examine the impact resistance of the wheel caps 1. The test was carried out by simply dropping a steel ball weighing 500 grams onto the decorative surface of the wheel caps 1 at atmospheric pressure at 23° C., and thereafter visually examining the appearance of the decorative surface of the wheel caps 1. No damage (e.g., cracks) occurred in the wheel caps 1 molded from the glass fiber reinforced resin compositions of the First Preferred Embodiment and Comparative Example 1, even when the steel ball dropped from a height of 50 cm. On the other hand, cracks occurred in the wheel cap 1 molded from the glass fiber reinforced resin composition of Comparative Example 5 when the steel ball dropped from a height of only 20 cm. Thus, the wheel cap 1 molded from the glass fiber reinforced resin composition of Comparative Example 5 was found to have inferior impact resistance.

In order to examine the appearance of the product, the sink marks on the front surface, (i.e., the decorative surface) of the wheel caps 1 were checked visually. The sink marks resulted from the presence of the stopper ribs 4 and the circular rib 5 disposed on the rear surface of the wheel caps 1. The visual examination revealed that no sink marks occurred in the wheel caps 1 molded from the glass fiber reinforced resin compositions of the First Preferred Embodiment and Comparative Example 5, and that their appearances were good. However, the wheel cap 1 molded from the glass fiber reinforced resin composition of Comparative Example 1 had a poor product appearance because sink marks appeared on the portions of the front surface of the wheel caps corresponding to the positions of the stopper ribs 4 and the circular rib 5 on the rear surface thereof.

The invention having been described, it will be appreciated by those of ordinary skill in the art that various modifications can be made within the scope of the following claims.

What is claimed is:

1. A glass fiber reinforced resin composition consisting essentially of:
   (1) 45 to 83% by weight of crystalline ethylene-propylene block copolymer exhibiting a melt flow rate of 20 to 100 grams/10 minutes, comprising (i) an ethylene component in an amount of 3 to 12% by weight, and (ii) components having low molecular weights falling within the range of 1,000 to 50,000 in weight average molecular weight and soluble in chloroform at room temperature, in an amount of 0.3 to 3.5% by weight;
   (2) 2 to 20% by weight of a polypropylene resin modified with an unsaturated carboxylic acid derivative; and
   (3) 15 to 35% by weight of glass fiber.

2. The glass fiber reinforced resin composition according to claim 1, wherein said components having low molecular weights are substances extracted from the crystalline ethylene-propylene block copolymer with chloroform at room temperature.

3. The glass fiber reinforced resin composition according to claim 2, wherein said components having low molecular weights are polypropylene, polyethylene, ethylene-propylene rubber or atactic polypropylene.

4. The glass fiber reinforced resin composition according to claim 1, wherein said unsaturated carboxylic acid derivative is maleic anhydride.

5. A wheel cap formed of a glass fiber reinforced resin composition consisting essentially of:
   (1) 45 to 83% by weight of crystalline ethylene-propylene block copolymer exhibiting a melt flow rate of 20 to 100 grams/10 minutes, comprising (i) an ethylene component in an amount of 3 to 12% by weight, and (ii) components having low molecular weights falling within the range of 1,000 to 50,000 in weight average molecular weight and soluble in chloroform at room temperature, in an amount of 0.3 to 3.5% by weight;
   (2) 2 to 20% by weight of a polypropylene resin modified with an unsaturated carboxylic acid derivative; and
   (3) 15 to 35% by weight of glass fiber.

6. The wheel cap according to claim 5, wherein said components having low molecular weights are substances extracted from the crystalline ethylene-propylene block copolymer with chloroform at room temperature.

7. The wheel cap according to claim 6, wherein said components having low molecular weights are polypropylene, polyethylene, ethylene-propylene rubber or atactic polypropylene.

8. The wheel cap according to claim 5, wherein said unsaturated carboxylic acid derivative is maleic anhydride.

9. The wheel cap according to claim 5, wherein said wheel cap is formed by injection molding.

* * * * *